United States Patent
Uchida

(10) Patent No.: US 8,445,875 B2
(45) Date of Patent: May 21, 2013

(54) OPTICAL CRYSTAL AND TERAHERTZ WAVE GENERATION DEVICE AND METHOD

(75) Inventor: Hirohisa Uchida, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 0 days.

(21) Appl. No.: 13/355,289

(22) Filed: Jan. 20, 2012

(65) Prior Publication Data

US 2012/0193554 A1     Aug. 2, 2012

(30) Foreign Application Priority Data

Feb. 1, 2011   (JP) ................................ 2011-019775
Dec. 29, 2011  (JP) ................................ 2011-290285

(51) Int. Cl.
  *G02F 1/35*    (2006.01)
  *G02F 1/37*    (2006.01)
  *H01S 3/109*   (2006.01)

(52) U.S. Cl.
  USPC ............... 250/493.1; 250/251; 250/504 R; 250/341.1; 359/326; 359/330; 359/332

(58) Field of Classification Search ........ 250/251, 250/341.1, 504 R; 359/326, 330, 332; 372/6, 372/10, 22
See application file for complete search history.

(56) References Cited

U.S. PATENT DOCUMENTS

| | | | |
|---|---|---|---|
| 7,020,372 B2* | 3/2006 | Lee et al. | 385/129 |
| 7,079,308 B2* | 7/2006 | Reed et al. | 359/326 |
| 7,410,980 B2* | 8/2008 | Uchida et al. | 514/338 |
| 7,626,756 B2* | 12/2009 | Dunn et al. | 359/330 |
| 7,710,637 B2* | 5/2010 | Ikari et al. | 359/330 |
| 7,835,066 B2* | 11/2010 | Livingston | 359/332 |
| 8,208,504 B2* | 6/2012 | Dantus et al. | 372/22 |
| 2009/0059226 A1* | 3/2009 | Kajiki et al. | 356/328 |
| 2009/0251767 A1* | 10/2009 | Ikari et al. | 359/330 |
| 2012/0044959 A1* | 2/2012 | Zhao et al. | 372/10 |
| 2012/0193554 A1* | 8/2012 | Uchida | 250/504 R |
| 2012/0195330 A1* | 8/2012 | Cho et al. | 372/6 |
| 2012/0211659 A1* | 8/2012 | Kitamura et al. | 250/341.1 |
| 2012/0239013 A1* | 9/2012 | Islam | 606/3 |

FOREIGN PATENT DOCUMENTS

| | | |
|---|---|---|
| JP | 6-265954 A | 9/1994 |
| JP | 8-201862 A | 8/1996 |
| JP | 11-284269 | 10/1999 |
| JP | 2005-317669 | 11/2005 |

(Continued)

OTHER PUBLICATIONS

Pan et al., "Crystal Growth and Characterization of the Organic Salt 4-$N$, $N$-Dimethylamino-4'-$N$'-methyl-stilbazolium Tosylate (DAST)", Adv. Mater, 8(7):592-595 (1996).

(Continued)

*Primary Examiner* — David A Vanore
(74) *Attorney, Agent, or Firm* — Morgan, Lewis & Bockius LLP

(57) ABSTRACT

An optical crystal includes a first non-linear optical crystal that generates terahertz waves corresponding to a difference frequency component in incident light with two different wavelengths by a difference frequency generation, and a second non-linear optical crystal that generates terahertz waves corresponding to a difference frequency component in incident light with two different wavelengths by a difference frequency generation, the second non-linear optical crystal being different in material from the first non-linear optical crystal, and the first non-linear optical crystal and the second non-linear optical crystal being disposed in contact or close together.

13 Claims, 13 Drawing Sheets

FOREIGN PATENT DOCUMENTS

| | | |
|---|---|---|
| JP | 2006-091802 | 4/2006 |
| JP | 2006-215222 | 7/2006 |
| JP | 2007-328145 | 12/2007 |
| JP | 4355593 | 11/2009 |

OTHER PUBLICATIONS

Shibuya et al., "Terahertz-Wave Generation Using a 4-Dimethylamino-*N*-methyl-4-stilbazolium tosylate Crystal Under Intra-Cavity Conditions", Applied Physics Express, 1:042002-1-042002-3 (2008).

Matsukawa et al., "Synthesis and terahertz-wave generation of mixed crystals composed of 1-methyl-4-{2-[4-(dimethylamino)phenyl]ethenyl}pyridinium p-toluenesulfonate and p-chlorobenzenesulfonate," Journal of Crystal Growth, 299: 344-348 (2007).

Partial Search Report issued in corresponding European Patent Application No. 12152324.5 dated Jun. 5, 2012.

* cited by examiner

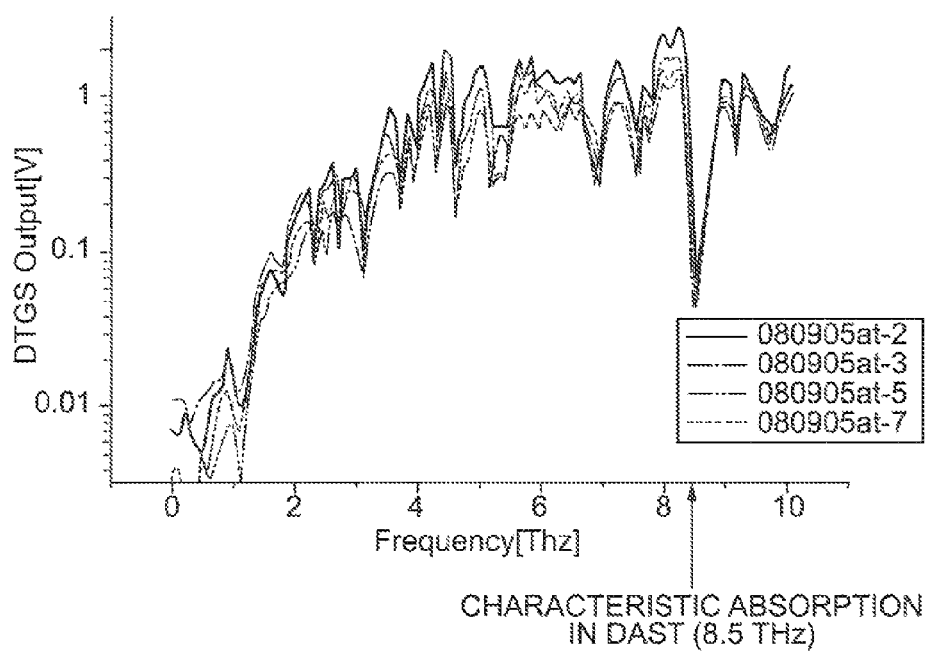

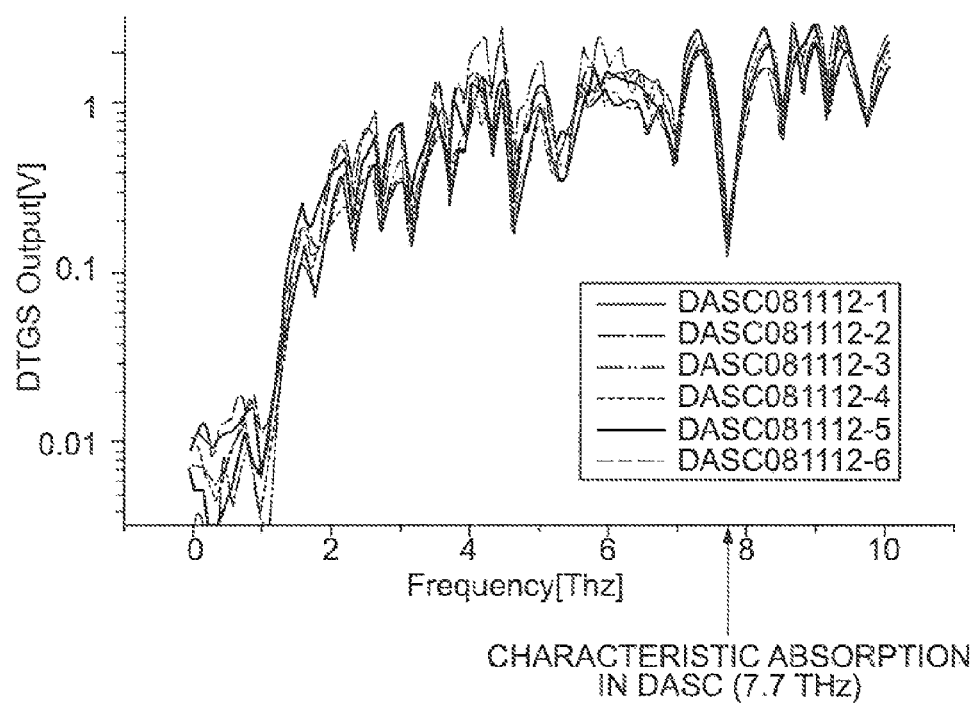

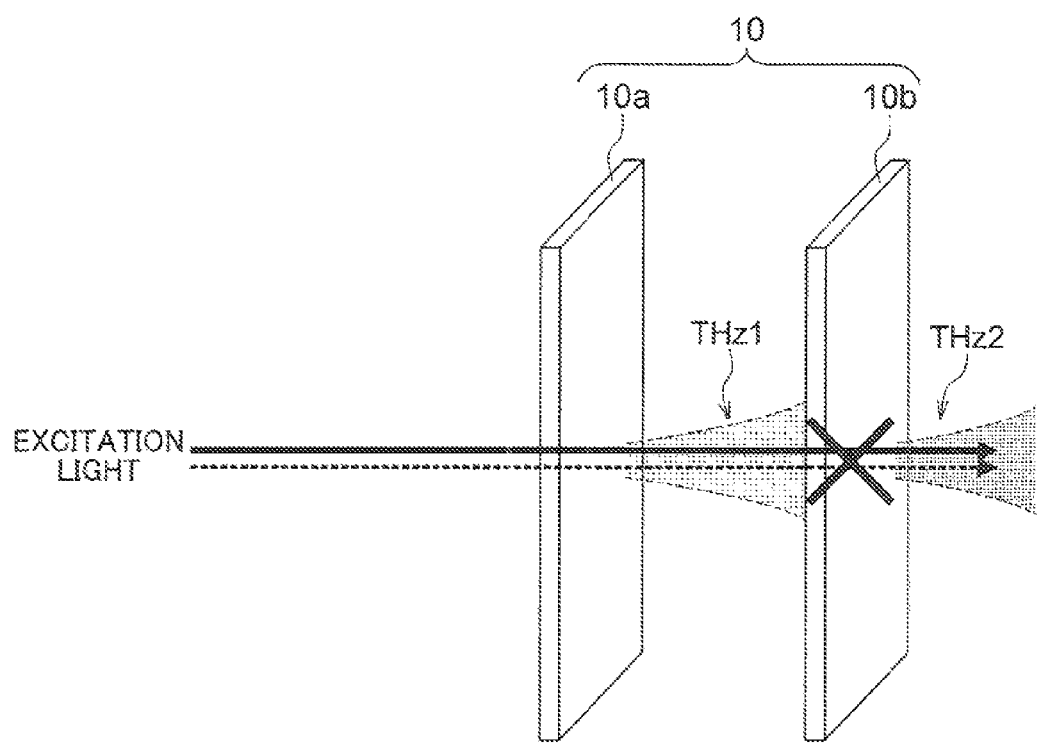

OPTICAL CRYSTAL AND TERAHERTZ WAVE GENERATION DEVICE AND METHOD

CROSS-REFERENCE TO RELATED APPLICATION

This application claims priority under 35 USC 119 from Japanese Patent Application No. 2011-019775 filed Feb. 1, 2011 and Japanese Patent Application No. 2011-290285 filed Dec. 29, 2011, the disclosures of which are incorporated by reference herein.

BACKGROUND

1. Technical Field

The present invention relates to an optical crystal and to a terahertz wave generation device and method.

2. Related Art

Heretofore, non-linear optical crystals have been known that are capable of generating terahertz waves using a difference-frequency generation effect, namely a non-linear optical effect. Characteristics of the terahertz waves that are generated are dependent on the physical characteristics of the non-linear optical crystals that are used. Therefore, the frequency ranges of the terahertz waves generated by the non-linear optical crystals that are used have particular characteristics of those crystals. Accordingly, obtaining terahertz waves with desired output characteristics in accordance with purposes of use of the terahertz waves is desired.

An organic material for generating terahertz waves has been proposed (for example, see Japanese Patent Application Laid-Open (JP-A) No. 2007-328145) in which non-linear optical crystals that are used for generating terahertz waves are formed into a mixed crystal containing a component A and a component B, as a result of which a fall in the intensity of the generated terahertz waves in a characteristic frequency region is suppressed.

However, although a fall in the intensity of the generated terahertz waves in a characteristic frequency region is suppressed to some extent by using the organic material for generating terahertz waves recited in JP-A No. 2007-328145, in the resulting characteristic, the intensity does fall in both a frequency region in which the intensity of terahertz waves generated using a non-linear optical crystal of component A alone would fall and a frequency region in which the intensity of terahertz waves generated using a non-linear optical crystal of component B alone would fall.

SUMMARY OF THE INVENTION

The present invention has been made in order to solve the problem described above and will provide an optical crystal that may generate terahertz waves with different spectroscopic characteristics from a single optical crystal, and a terahertz wave generation device.

In order to achieve the object described above, an optical crystal according to a first aspect includes: a first non-linear optical crystal that generates terahertz waves corresponding to a difference frequency component in incident light with two different wavelengths by a difference frequency generation; and a second non-linear optical crystal that generates terahertz waves corresponding to a difference frequency component in incident light with two different wavelengths by a difference frequency generation, the second non-linear optical crystal being different in material from the first non-linear optical crystal, and the first non-linear optical crystal and the second non-linear optical crystal being disposed in contact or close together.

According to the optical crystal of the first aspect, the first non-linear optical crystal generates terahertz waves corresponding to the difference frequency component of the two different wavelengths generated by a difference in frequency of the light with two different wavelengths that is incident thereon. The second non-linear optical crystal also generates terahertz waves corresponding to the difference frequency component of the two different wavelengths generated by a difference in frequency of the light with two different wavelengths that is incident thereon. Because the second non-linear optical crystal is of a different material from the first non-linear optical crystal, these terahertz waves are different from the terahertz waves generated by the first non-linear optical crystal. The first non-linear optical crystal and the second non-linear optical crystal are disposed in contact or close to one another to structure the single optical crystal. Thus, terahertz waves with different spectroscopic characteristics may be generated by the single optical crystal, by the incidence angle at which the light with two different wavelengths is incident on the optical crystal being switched.

In the optical crystal of the first aspect, the first non-linear optical crystal and the second non-linear optical crystal may be disposed such that a vector direction of any optical axis of the first non-linear optical crystal and a vector direction of any optical axis of the second non-linear optical crystal are aligned in the same direction. Further, in the optical crystal of the first aspect, the first non-linear optical crystal and the second non-linear optical crystal may be disposed such a the vector direction of an optical axis of the second non-linear optical crystal and a vector direction of a corresponding optical axis of the first non-linear optical crystal are aligned in the same direction. For example, the first non-linear optical crystal and the second non-linear optical crystal may be disposed such that the vector directions of the respective a axes are oriented in the same direction. Alternatively, the first non-linear optical crystal and the second non-linear optical crystal may be disposed such that the vector directions of respective optical axes at which optical characteristics are greatest are aligned in the same direction. In this case, performances of the first non-linear optical crystal and the second non-linear optical crystal may be brought up to a maximum.

In the optical crystal of the first aspect, each of the first non-linear optical crystal and the second non-linear optical crystal comprises a compound having a structure in which a backbone is a bivalent linking group, and an electron-accepting group and an electron-donating group are bonded to the backbone. Specifically, the compound may be a compound selected from the group consisting of DAST crystal, DASC crystal, OH1, BNA, BDAS-TP, DAS-HTP and MC-TPS.

In the optical crystal of the first aspect, the first non-linear optical crystal and the second non-linear optical crystal are contacted by any of a fusing method, a crystal growth method or an adhesion method.

A terahertz wave generation device according to a second aspect includes: the optical crystal according to the first aspect; a light generation unit that generates the light with two different wavelengths; and an incidence unit that causes the light with two different wavelengths generated by the light generation unit to be incident on the optical crystals such that the light with two different wavelengths is transmitted in a direction through the first non-linear optical crystal to the second non-linear optical crystal and in a direction through the second non-linear optical crystal to the first non-linear optical crystal.

According to the terahertz wave generation device of the second aspect, the light generation unit generates the light with two different wavelengths. The incidence unit makes the light with two different wavelengths generated by the light generation unit incident on the optical crystal such that the light is transmitted in the direction through the first non-linear optical crystal to the second non-linear optical crystal and in the direction through the second non-linear optical crystal to the first non-linear optical crystal. Thus, terahertz waves with different spectroscopic characteristics may be generated by the single optical crystal, by the incidence direction of the light with two different wavelengths that is incident on the optical crystal being switched by the incidence unit.

In the terahertz wave generation device of the second aspect, the incidence unit may include a turning member that turns at least one of the optical crystal or the light generation unit between: a position at which the light with two different wavelengths generated by the light generation unit is transmitted in the direction through the first non-linear optical crystal to the second non-linear optical crystal; and a position at which the light with two different wavelengths is transmitted in the direction through the second non-linear optical crystal to the first non-linear optical crystal. Further, the incidence unit may include: a mirror that reflects the light with two different wavelengths generated by the light generation unit; a transmission portion that transmits the light with two different wavelengths and light reflected by the mirror; and a reflection surface that reflects incident terahertz waves, wherein a pair of off-axis parabolic surface mirrors are disposed between the light generation unit and the mirror, sandwiching the optical crystal so as to reflect the incident terahertz waves.

A terahertz wave generation device according to a third aspect includes: a first mirror; a light generation unit that is provided with a second mirror that configures a resonator with the first mirror, the light generation unit generating light with two different wavelengths; a pair of off-axis parabolic surface mirrors that are each provided with: a transmission portion that transmits the incident light with two different wavelengths; and a reflection surface that reflects incident terahertz waves, the pair of off-axis parabolic surface mirrors being disposed in the resonator so as to reflect the incident terahertz waves; and the optical crystal according to claim 1, which is disposed between the pair of off-axis parabolic surface mirrors.

According to the terahertz wave generation device of the third aspect, the light generation unit that is equipped with the first mirror and the second mirror that, together with the first mirror, constitutes the resonator generates the light with two different wavelengths. The light with two different wavelengths is transmitted through the transmission portions of the pair of off-axis parabolic surface mirrors disposed inside the resonator, is incident on the optical crystal disposed between the pair of off-axis parabolic surface mirrors, and generates terahertz waves with respectively different spectroscopic characteristics from the optical crystal. The off-axis parabolic surface mirrors are provided with reflective surfaces that reflect incident terahertz waves, and the reflective surfaces reflect the terahertz waves that are generated by the optical crystal and are incident thereon.

Thus, the light with two different wavelengths may be made incident on the optical crystal from both directions by the optical crystal of the first aspect being disposed between the pair of off-axis parabolic surface mirrors disposed in the resonator, and terahertz waves with different spectroscopic characteristics may be generated by the single optical crystal.

The terahertz wave generation device of the third aspect may further include a mixer that mixes the respective terahertz waves reflected from the pair of off-axis parabolic surface mirrors. Thus, terahertz waves in which the terahertz waves with different spectroscopic characteristics are mixed may be obtained.

A terahertz wave generation method according to a fourth aspect includes: for generating terahertz waves with a first spectroscopic characteristic, causing light with two different wavelengths to be incident on the optical crystal according to the first aspect such that the light with two different wavelengths is transmitted in a direction through the first non-linear optical crystal to the second non-linear optical crystal; and, for generating terahertz waves with a second spectroscopic characteristic that is different from the first spectroscopic characteristic, causing the light with two different wavelengths to be incident on the optical crystal such that the light with two different wavelengths is transmitted in a direction through the second non-linear optical crystal to the first non-linear optical crystal.

A terahertz wave generation method according to a fifth aspect includes: resonating light with two different wavelengths, and causing the light with two different wavelengths to be incident on the optical crystal according to the first aspect such that the light with two different wavelengths is transmitted in a direction through the first non-linear optical crystal of the optical crystal to the second non-linear optical crystal and in a direction through the second non-linear optical crystal to the first non-linear optical crystal; generating first terahertz waves from the first non-linear optical crystal side of the optical crystal; and generating second terahertz waves from the second non-linear optical crystal side of the optical crystal.

BRIEF DESCRIPTION OF THE DRAWINGS

Exemplary embodiments of the present invention will be described in detail based on the following figures, wherein:

FIG. 2 is a graph illustrating a spectral characteristic of terahertz waves generated by a DAST crystal.

FIG. 3 is a graph illustrating a spectral characteristic of terahertz waves generated by a DASC crystal.

FIG. 5 is a diagram for describing the theory of terahertz waves with different spectral characteristics being generated in accordance with incidence directions of excitation light.

DETAILED DESCRIPTION

Herebelow, exemplary embodiments of the optical crystal and terahertz wave generation device of the present invention are described in detail, referring to the attached drawings.

Figure 1:
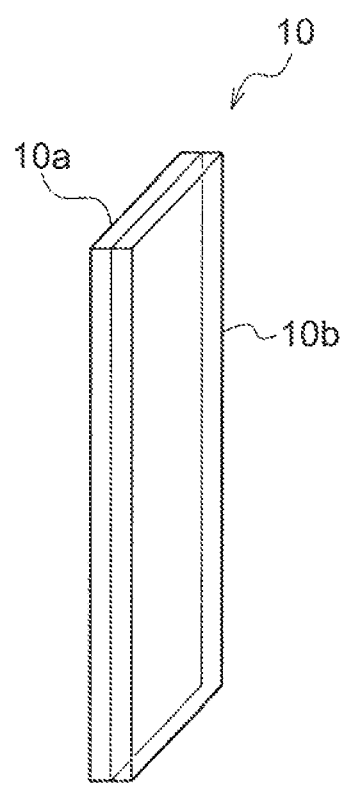
FIG. 1 is an external perspective view illustrating an optical crystal of a first exemplary embodiment.

As illustrated in FIG. 1, an optical crystal 10 of a first exemplary embodiment is formed by two thin plate-shaped non-linear optical crystals of different materials being bonded together. In the present exemplary embodiment, an example is described in which one of the non-linear optical crystals is a DAST crystal (4-dimethylamino-N-methyl-4-stilbazolium tosylate) 10a, and the other of the non-linear optical crystals is a DASC crystal (4-dimethylamino-N-methyl-4-stilbazolium-p-chlorobenzene sulfonate) 10b.

By difference-frequency generation from light of two different wavelengths (excitation light) that is incident, each of the non-linear optical crystals, the DAST crystal 10a and the DASC crystal 10b, generates terahertz waves corresponding to a difference frequency component of the two different wavelengths. A spectrum of the terahertz waves generated when this excitation light is incident on a single body of the DAST crystal 10a shows absorption of the output power in the vicinity of 8.5 THz, as illustrated in FIG. 2. A spectrum of the terahertz waves generated when this excitation light is incident on a single body of the DASC crystal 10b shows absorption of the output power in the vicinity of 7.7 THz, as illustrated in FIG. 3.

Figure 4A:
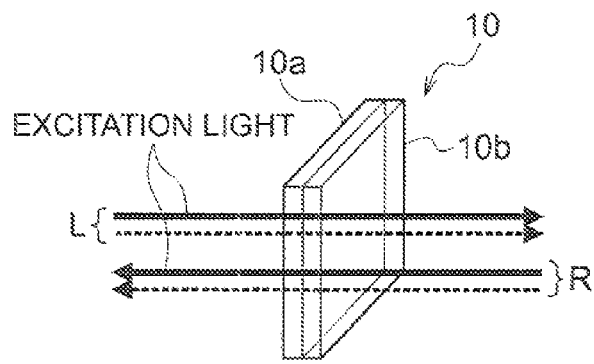
FIG. 4A is a diagram for describing incidence directions of excitation light on the optical crystal.
Figure 4B:
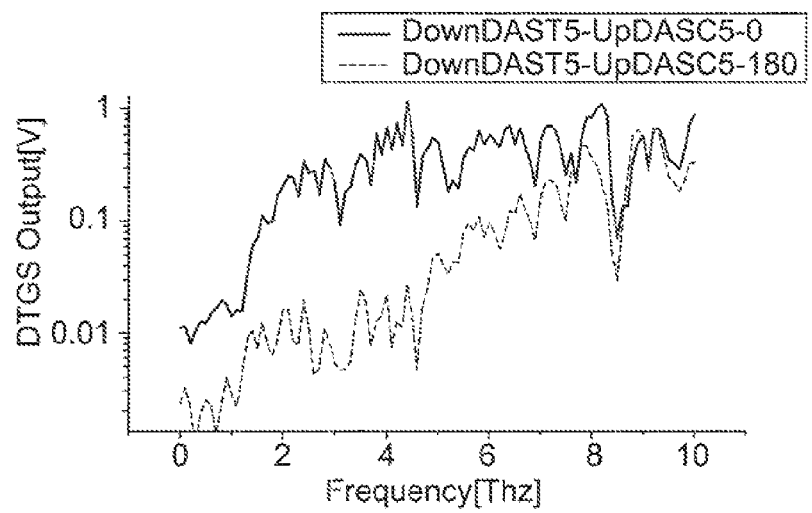
FIG. 4B is a graph illustrating a spectral characteristic when excitation light is incident from a DAST crystal side.
Figure 4C:
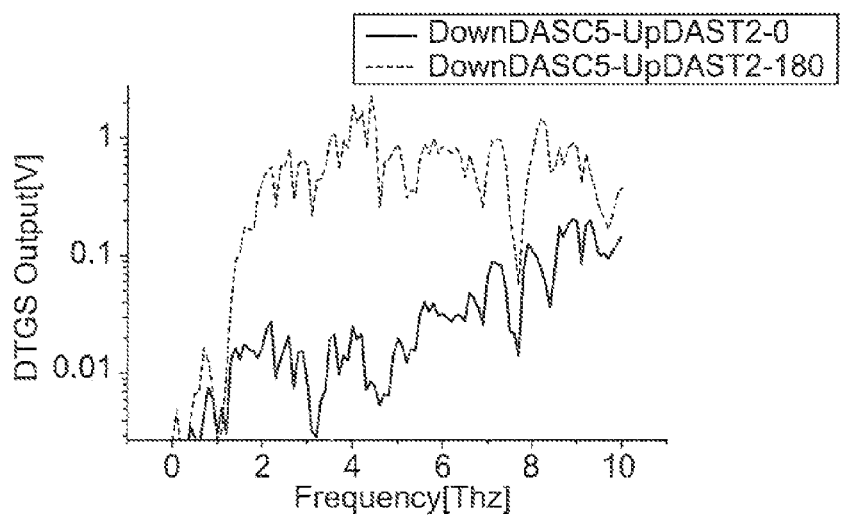
FIG. 4C is a graph illustrating a spectral characteristic when excitation light is incident from a DASC crystal side.

Spectra of the terahertz waves that are generated when excitation light is incident on the optical crystal 10 of the present exemplary embodiment, in which the two non-linear optical crystals that generate terahertz waves with different characteristics are bonded together, are illustrated in FIG. 4A to FIG. 4C. FIG. 4B is a spectrum of the terahertz waves when the excitation light is incident from the direction through the DASC crystal 10b to the DAST crystal 10a (the direction of arrow R shown in FIG. 4A). In this case, similarly to the characteristic of the terahertz wave spectrum of the DAST crystal 10a (FIG. 2), which is the crystal at the face of the side at which the terahertz waves are generated, the terahertz waves are generated with a spectrum that includes absorption of the output power in the vicinity of 8.5 THz. In contrast, FIG. 4C is a spectrum of the terahertz waves when the excitation light is incident from the direction through the DAST crystal 10a to the DASC crystal 10b (the direction of arrow L shown in FIG. 4A). In this case, similarly to the characteristic of the terahertz wave spectrum of the DASC crystal 10b (FIG. 3), which is the crystal at the face of the side at which the terahertz waves are generated, the terahertz waves are generated with a spectrum that includes absorption of the output power in the vicinity of 7.7 THz. Note that the two spectra respectively illustrated in FIG. 4B and FIG. 4C are of cases in which the optical axes are set inversely to one another when the DAST crystal 10a and the DASC crystal 10b are superposed. Optical axes are discussed in more detail below.

Theory of the characteristics of the terahertz waves that are generated being different in accordance with the incidence direction of the excitation light on this optical crystal 10 is described. As illustrated in FIG. 5, when the excitation light is incident from the side of the DAST crystal 10a, terahertz waves (terahertz waves THz1) with a characteristic as illustrated in FIG. 2 are generated by the DAST crystal 10a, and these terahertz waves THz1 are absorbed by the DASC crystal 10b. Excitation light that has passed through the DAST crystal 10a is incident on the DASC crystal 10b, and terahertz waves (terahertz waves THz2) with a characteristic as illustrated in FIG. 3 are generated by the DASC crystal 10b. Therefore, only the terahertz waves THz2 are generated by the optical crystal 10. Similarly, when the excitation light is incident from the side of the DASC crystal 10b, first the terahertz waves THz2 are generated by the DASC crystal 10b and the terahertz waves THz2 are absorbed by the DAST crystal 10a, and the terahertz waves THz1 are generated by excitation light that has passed through the DASC crystal 10b being incident on the DAST crystal 10a. Therefore, only the terahertz waves THz1 are generated by the optical crystal 10. In FIG. 5, for convenience of illustration, a space is opened between the DAST crystal 10a and the DASC crystal 10b. However, in the optical crystal 10 of the present exemplary embodiment, the two crystals are disposed to be in contact or close together.

As described hereabove, according to the optical crystal 10 of the first exemplary embodiment, terahertz waves with different spectral characteristics depending on the incidence direction of the excitation light on the optical crystal 10 may be obtained.

Now, a method of fabrication of the optical crystal 10 of the first exemplary embodiment is described.

Figure 6:
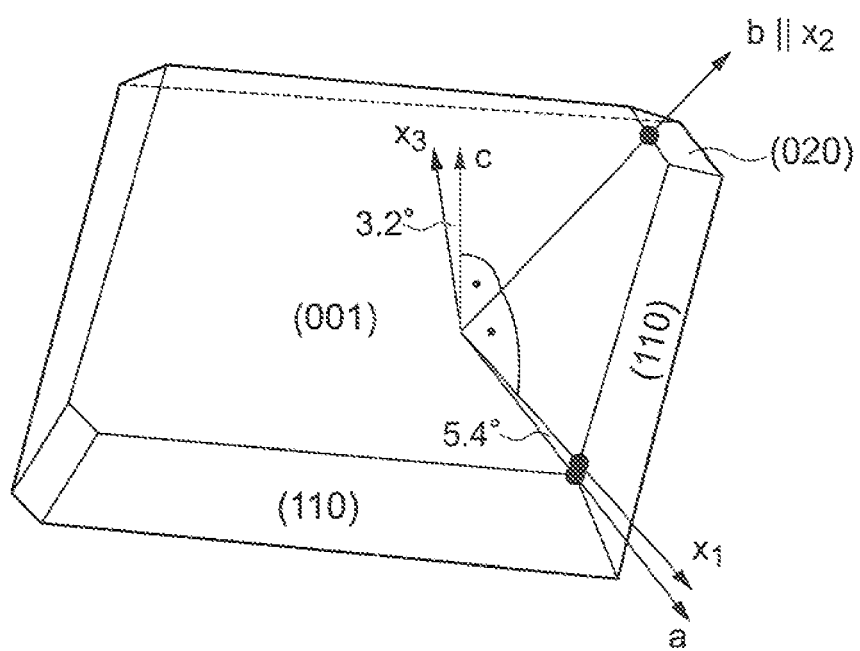
FIG. 6 is a diagram for describing optical axes.

First, the optical axes of the DAST crystal 10a and the DASC crystal 10b are identified. The term "optical axes" as used herein includes a direction in a birefringent crystal with optical isomerism in which the refractive index is constant, birefringence does not occur even when unpolarized light is incident, and ordinary rays and extraordinary rays coincide, or a direction in which the divergence of the ordinary rays and the extraordinary rays is at a minimum. As illustrated in FIG. 6, the optical axes of a non-linear optical crystal may be uniquely determined from the refractive indices and crystal structure of the crystal. FIG. 6 illustrates optical axes of a DAST crystal.

For identification of optical axes, the optical axes may be identified by a method of measuring refractive indices such as, for example, a method of measuring absorption coefficients and calculating the Kramers-Kronig relationship. The optical axes may also be identified by a method of determining the optical axes from molecular alignments by crystal structure analysis. The optical axes may also be identified experimentally, by directly irradiating electromagnetic fields onto the crystal with arbitrary conditions specified and identifying orientations at which characteristics are maximized Further, depending on the crystal, there are crystals in which the optical axes may be identified visually by the crystal habit, so visual identification is also possible.

Figure 7:
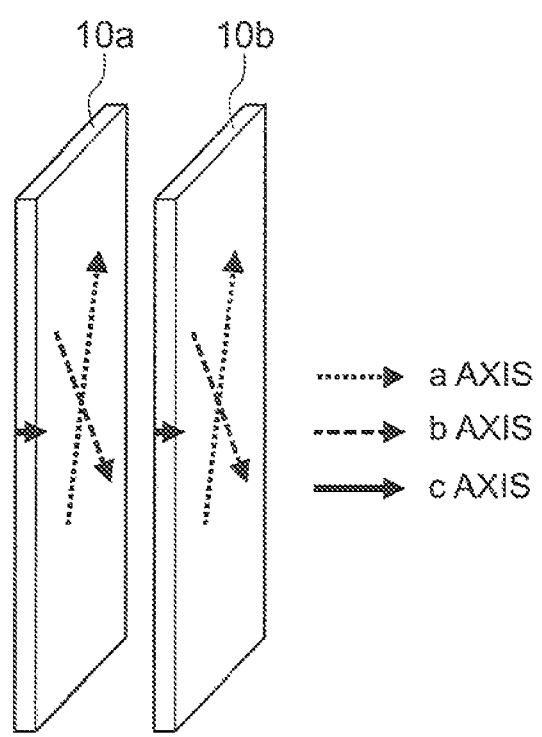
FIG. 7 is a diagram for describing the directions of optical axes when two non-linear optical crystals are bonded together.

Then, as illustrated in FIG. 7, the DAST crystal 10a and the DASC crystal 10b are superposed such that identified optical axes coincide. When birefringent crystals with birefringence such as a DAST crystal and a DASC Crystal are superposed, respective performances of the crystals may be brought out by the crystals being superposed such that the matching optical axes for either ordinary rays or extraordinary rays coincide. Maximum performance may also be brought out by superposing the optical axes such that the optical characteristics of the respective crystals are maximized. For example, the a axes of DAST crystals and DASC crystals and the c axis of an OH1 crystal correspond to optical axes at which optical characteristics are maximized. Therefore, if a DAST crystal and a DASC crystal are superposed as in the present exemplary embodiment, they may be superposed such that the a axes of the two crystals coincide. As a further example, if a DAST crystal and an OH1 crystal are superposed, they may be superposed such that the a axis of the DAST crystal and the c axis of the OH1 crystal coincide.

Next, the superposed DAST crystal 10a and DASC crystal 10b are bonded together. A bonding method may be a fusing method, a crystal growth method or an adhesion method. The respective bonding methods are described below.

A fusing method to bond together materials with different melting points is a method of bonding the respective crystals together by heating to the melting point of the material with the lower melting point and slightly melting that crystal, and then cooling and solidifying. To be specific, the melting points of the DAST crystal 10a and the DASC crystal 10b are 256° C. and 281.5° C., respectively. Accordingly, in a state in which the two crystals are superposed with their optical axes aligned, heating is applied to close to the melting point of the DAST crystal 10a, and the DAST crystal 10a is slightly melted and is fused to the DASC crystal 10b.

When a crystal growth method is used, the crystals are bonded at the molecular level by using the DAST crystal 10a or the DASC crystal 10b as a seed crystal and inducing crystal growth in a solution of the other material (for example, a DASC solution when the seed crystal is the DAST crystal 10a, or a DAST solution when the seed crystal is the DASC crystal 10b).

In an adhesion method, the superposed faces with the optical axes aligned are adhered by an adhesive with a refractive index between the refractive indices of the optical axes of the two crystals. Thus, the bonded crystal may be fabricated with little loss of performance.

Herein, a case in which the DAST crystal and the DASC crystal are bonded by fusing is described. However, the single optical crystal may have a structure in which the two non-linear optical crystals are close to one another, that is, are disposed with a gap formed between the two non-linear optical crystals.

Next, a second exemplary embodiment is described. In the second exemplary embodiment, a terahertz wave generation device that is constituted using the optical crystal 10 of the first exemplary embodiment is described.

Figure 8:
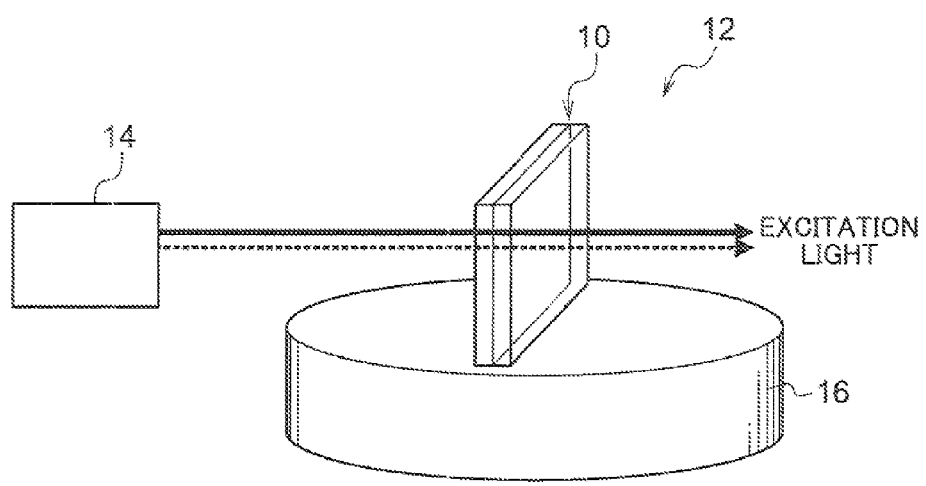
FIG. 8 is a schematic diagram illustrating structure of a terahertz wave generation device of a second exemplary embodiment.

As illustrated in FIG. 8, a terahertz wave generation device 12 of the second exemplary embodiment includes the optical crystal 10, an excitation light source 14 and a turning stage 16. The excitation light source 14 generates excitation light with two different wavelengths that is to be made incident on the optical crystal 10. The turning stage 16 is for switching which face of the optical crystal 10 the excitation light is incident on.

The excitation light source 14 may use, for example, a two wavelength-generating semiconductor laser that is capable of generating light with two different wavelengths, or the like.

The turning stage 16 is structured to be turnable with the optical crystal 10 placed thereon. Turning of the turning stage 16 may be carried out manually, or a drive source such as a motor or the like may be provided for turning the turning stage 16.

Next, operation of the terahertz wave generation device 12 of the second exemplary embodiment is described.

Firstly, the optical crystal 10 is placed on the turning stage 16. Then the turning stage 16 is turned with consideration to the face of the optical crystal 10 at which the excitation light is to be incident, such that terahertz waves with desired characteristics will be obtained. Specifically, when the terahertz waves THz2 generated by the DASC crystal are to be obtained, the surface of the DAST crystal 10a is disposed toward the excitation light source 14 as illustrated in the left side drawing of FIG. 9, with the turning stage 16 being turned such that the optical path of the excitation light coincides with a direction perpendicular to the surface of the optical crystal 10.

Thereafter, excitation light is generated by the excitation light source 14 and the excitation light is incident on the optical crystal 10. Accordingly, the terahertz waves THz1 generated by the DAST crystal 10a are absorbed by the DASC crystal 10b and the terahertz waves THz2 are generated by the DASC crystal 10b, and the desired terahertz waves THz2 may be obtained.

Figure 9:
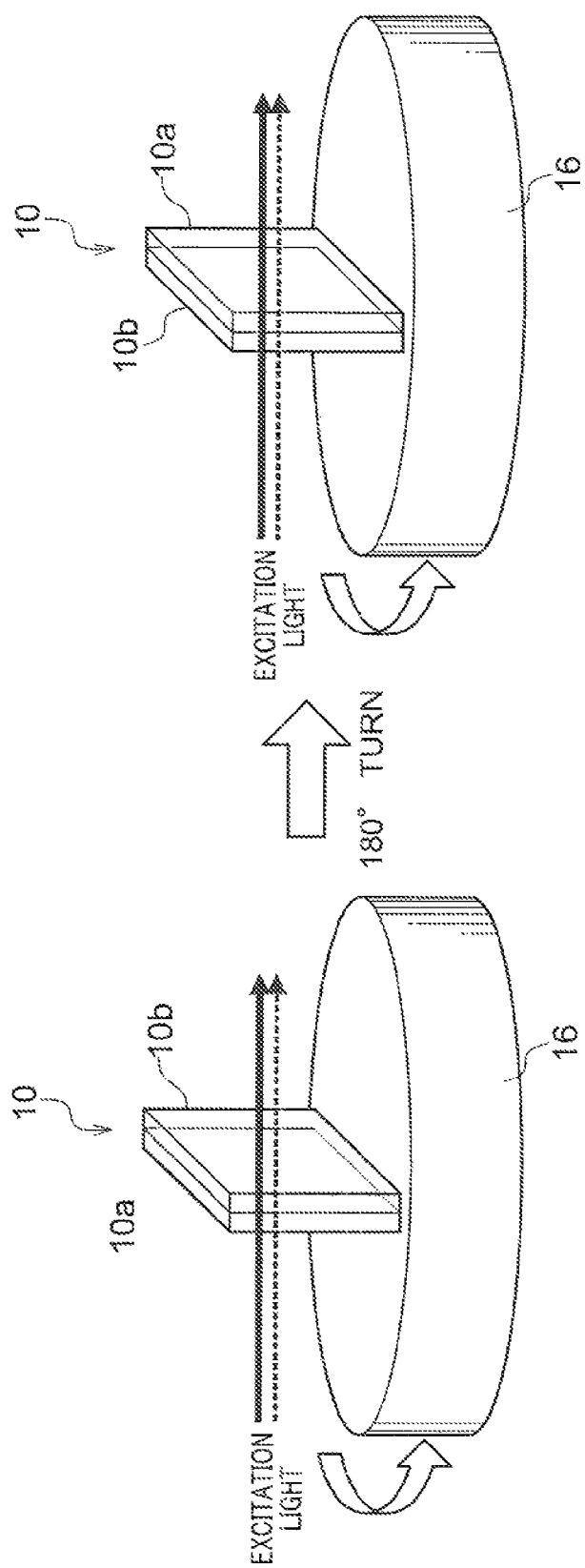
FIG. 9 is a diagram for describing incidence directions of the excitation light on the optical crystal.

When the terahertz waves THz1 generated by the DAST crystal are to be obtained, the turning stage is turned 180° from the position described above and the surface of the DASC crystal 10b is disposed toward the excitation light source 14, as illustrated in the right side drawing of FIG. 9, such that the optical path of the excitation light coincides with a direction perpendicular to the surface of the optical crystal 10.

Thereafter, excitation light is generated by the excitation light source 14 and the excitation light is incident on the optical crystal 10. Accordingly, the terahertz waves THz2 generated by the DASC crystal 10b are absorbed by the DAST crystal 10a and the terahertz waves THz1 are generated by the DAST crystal 10a, and the desired terahertz waves THz1 may be obtained.

As described above, according to the terahertz wave generation device of the second exemplary embodiment, the optical crystal in which the DAST Crystal and the DASC Crystal are bonded together is turned by the turning stage and, by the face at which the excitation light is incident being switched, terahertz waves with different spectroscopic characteristics may be obtained without the optical crystal being replaced or suchlike.

In the second exemplary embodiment, a case in which the optical crystal is turned about an axis along the vertical direction is described. However, the optical crystal may be turned about an axis along a horizontal direction. Further, rather than just the optical crystal being turned, the position of the excitation light source may be altered, or both the optical crystal may be turned and the position of the excitation light source altered so as to switch between the excitation light in one incidence direction and the excitation light in the other incidence direction. Further yet, a first excitation light source may be provided for excitation light in the one incidence direction and a second excitation light source provided for excitation light in the other incidence direction. However, with consideration to size and costs of the device, a constitution in which the optical crystal is turned as in the present exemplary embodiment is preferable.

Next, a third exemplary embodiment is described. In the third exemplary embodiment, a terahertz wave generation device that is constituted using the optical crystal 10 of the first exemplary embodiment is described.

Figure 10:
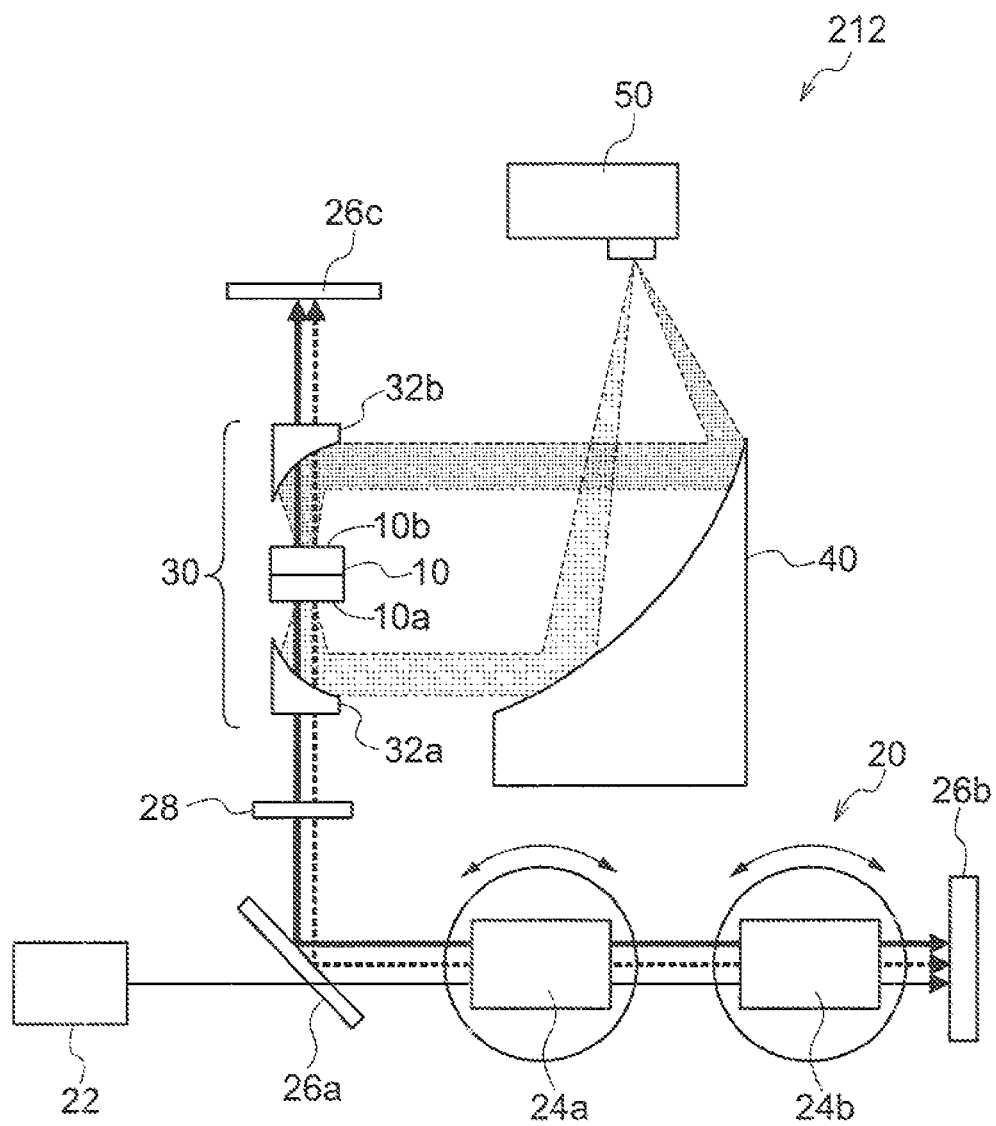
FIG. 10 is a schematic diagram illustrating structure of a terahertz wave generation device of a third exemplary embodiment.

As illustrated in FIG. 10, a terahertz wave generation device 212 of the third exemplary embodiment includes a KTP parametric resonator (KTP-OPO) 20 that generates excitation light with two different wavelengths, a terahertz wave generation section 30 disposed inside the KTP-OPO 20, and an off-axis parabolic surface mirror 40 that mixes the two terahertz waves generated by the terahertz wave generation section 30.

The KTP-OPO 20 includes a pumped light source 22, two KTP (potassium titanyl phosphate: $KTiOPO_4$) crystals 24a and 24b, three mirrors 26a, 26b and 26c, and an SHG-cut filter 28.

The pumped light source 22 is a light source that outputs pumped light as a source for generating excitation light with two wavelengths from the KTP-OPO 20. For example, a YAG laser (wavelength 532 nm, pulse width 15 ns, cycling frequency 50 Hz) or the like may be used as the pumped light source 22.

The KTP crystals 24a and 24b are placed on respective turning stages such that incidence angles of the pumped light on the crystals may be independently adjusted. The frequencies of the excitation light generated by the KTP-OPO 20 may be altered by altering the incidence angles of the pumped light on the KTP crystals.

The mirrors 26a, 26b and 26c are dichroic mirrors with high reflectivities with respect to light with wavelengths from 1300 to 1500 nm. The mirror 26a is disposed at an angle of 45° with respect to the optical path of the pumped light. The mirror 26a, the two KTP crystals 24a and 24b and the mirror 26b are arranged in this order on the line of the optical path of the pumped light, and the SHG-cut filter 28, the terahertz wave generation section 30 and the mirror 26c are arranged in this order on a line orthogonal to the optical path of the pumped light that branches from the mirror 26a.

The SHG-cut filter 28 is a filter that removes a component with a wavelength of 532 nm. The SHG-cut filter 28 removes a 532-nm component that remains in the excitation light before the excitation light is incident on the optical crystal 10, in order for high-precision excitation light to be incident on the optical crystal 10.

The terahertz wave generation section 30 is structured with a pair of holed off-axis parabolic surface mirrors 32a and 32b and the optical crystal 10, which is disposed between the pair of holed off-axis parabolic surface mirrors 32a and 32b.

As described in the first exemplary embodiment, the optical crystal 10 is an optical crystal in which the DAST crystal 10a and the DASC crystal 10b are bonded together.

Figure 11:
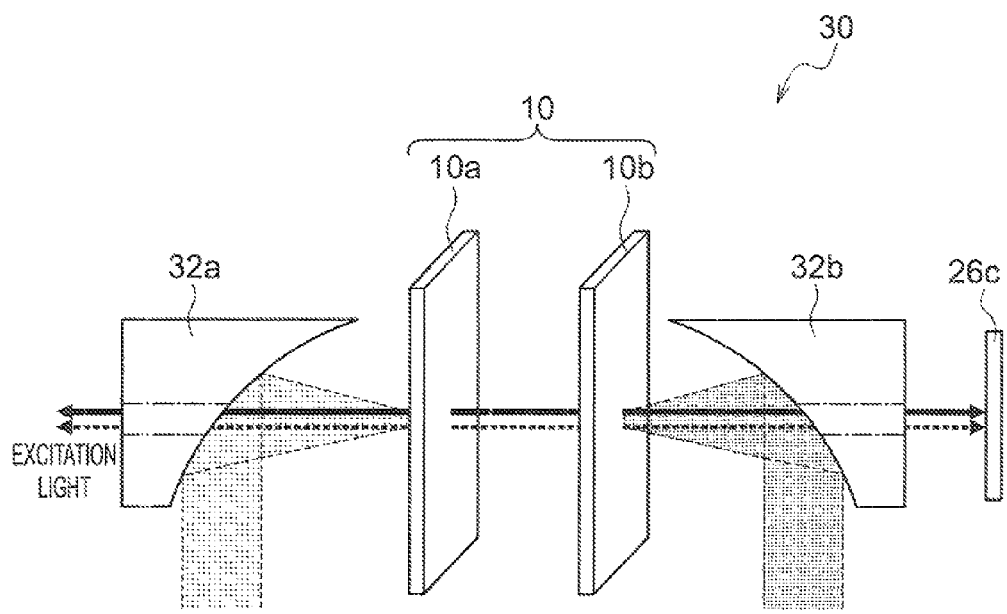
FIG. 11 is a schematic diagram illustrating structure of a terahertz wave generation section of the terahertz wave generation device of the third exemplary embodiment.

The pair of holed off-axis parabolic surface mirrors 32a and 32b are parabolic surface mirrors, in each of which a hole is formed at the middle (see the single-dot chain lines in FIG. 11, which are not shown in FIG. 10). The pair of holed off-axis parabolic surface mirrors 32a and 32b are disposed such that the excitation light passes through the holes and such that the parabolic surfaces face one another. More specifically, as illustrated in FIG. 11, the holed off-axis parabolic surface mirror 32a is disposed at the DAST crystal 10a side of the optical crystal 10 and the holed off-axis parabolic surface mirror 32b is disposed at the DASC crystal 10b side of the optical crystal 10. The holed off-axis parabolic surface mirrors 32a and 32b are disposed such that the excitation light passes through the respective holes and such that the terahertz waves THz1 generated by the DAST crystal 10a and the terahertz waves THz2 generated by the DASC crystal 10b are both reflected in the same direction. Although a space is opened between the DAST crystal 10a and the DASC crystal 10b in FIG. 11 for convenience of illustration, the two crystals are disposed in contact or close together in the optical crystal 10 of the present exemplary embodiment.

The off-axis parabolic surface mirror 40 mixes the terahertz waves respectively reflected by the holed off-axis parabolic surface mirrors 32a and 32b and makes the terahertz waves incident on a detector 50. Although the terahertz waves are incident on the detector 50 in this case, in practice, depending on the purpose of use of the terahertz waves, an examination stage is disposed at the position of the detector 50, and terahertz waves that are transmitted through or reflected by a subject placed on the examination stage are detected by a detector.

Next, operation of the terahertz wave generation device 212 of the third exemplary embodiment is described.

Firstly, when pumped light is outputted from the pumped light source 22, at the KTP-OPO 20, the pumped light passes through the mirror 26a and is incident on the KTP crystals 24a and 24b, and the excitation light with two different wavelengths (from 1300 to 1500 nm) is generated. The generated excitation light is reflected by the mirrors 26b and 26a, is reflected toward the mirror 26c, has the remaining 532-nm component removed by the SHG-cut filter 28, and is incident on the terahertz wave generation section 30.

The excitation light passes through the hole in the holed off-axis parabolic surface mirror 32a, and is incident on the optical crystal 10 through the face at the DAST crystal 10a side thereof. The terahertz waves THz1 are generated by the DAST crystal 10a and absorbed by the DASC crystal 10b, and the terahertz waves THz2 are generated by the DASC crystal 10b.

The generated terahertz waves THz2 are reflected in a consistent direction (herein, toward the off-axis parabolic surface mirror 40) by the off-axis surface of the holed off-axis parabolic surface mirror 32b, while excitation light that passes through the optical crystal 10 then passes through the hole in the holed off-axis parabolic surface mirror 32b and is reflected by the mirror 26c.

The excitation light reflected by the mirror 26c passes through the hole in the holed off-axis parabolic surface mirror 32b again, and is incident on the optical crystal 10 through the face at the DASC crystal 10b side thereof. The terahertz waves THz2 are generated by the DASC crystal 10b and absorbed by the DAST crystal 10a, and the terahertz waves THz1 are generated by the DAST crystal 10a.

The generated terahertz waves THz1 are reflected in the consistent direction (toward the off-axis parabolic surface mirror 40) by the off-axis surface of the holed off-axis parabolic surface mirror 32a, while excitation light that passes through the optical crystal 10 then passes through the hole in the holed off-axis parabolic surface mirror 32a, is reflected by the mirror 26a, and returns toward the mirror 26b.

The terahertz waves THz1 reflected by the holed off-axis parabolic surface mirror 32a and the terahertz waves THz2 reflected by the holed off-axis parabolic surface mirror 32b are mixed at the off-axis parabolic surface mirror 40 and are made incident on the detector 50.

As described hereabove, according to the terahertz wave generation device of the third exemplary embodiment, the optical crystal in which the DAST crystal and the DASC crystal are bonded together is disposed inside the KTP-OPO, and the terahertz waves generated by the DAST crystal and the terahertz waves generated by the DASC crystal are separately extracted and mixed. Therefore, terahertz waves in which the characteristics of the respective terahertz waves complement one another may be obtained.

Moreover, if a structure capable of switching between detection of the terahertz waves generated from the DAST crystal side, detection of the terahertz waves generated from the DASC crystal side and detection of the mixed terahertz waves is formed, terahertz waves with three different kinds of spectroscopic characteristics may be obtained from a single terahertz wave generation device.

Figure 12:
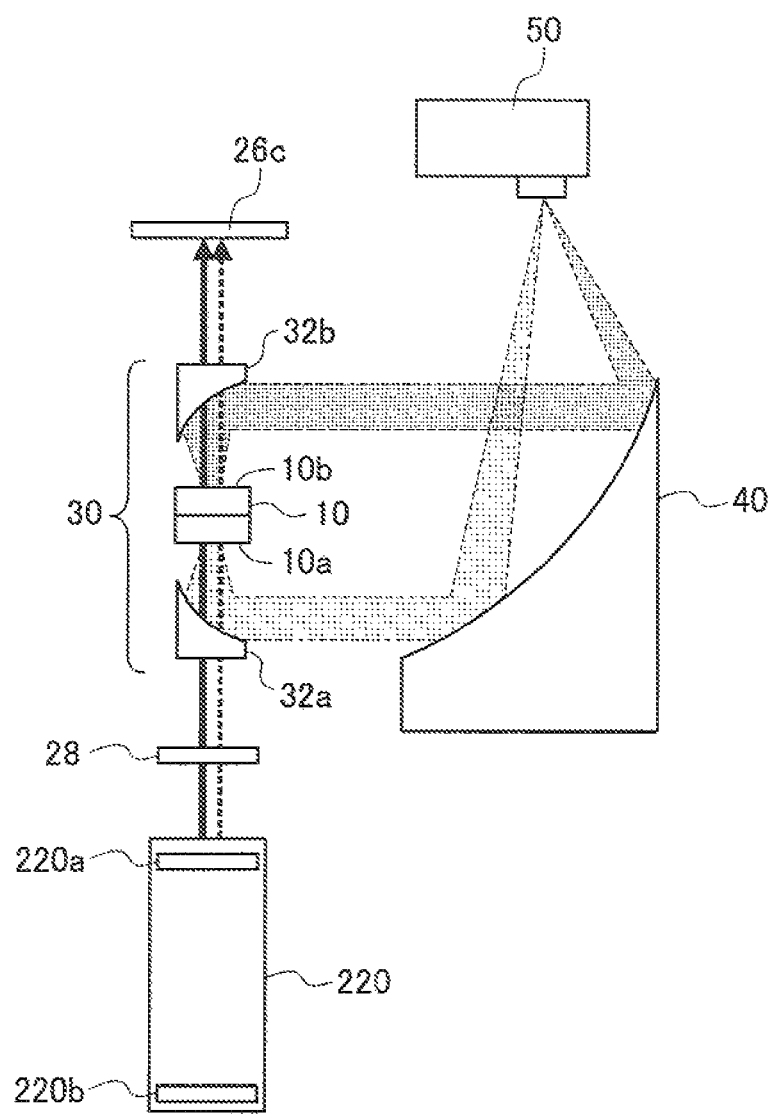
FIG. 12 is a schematic diagram illustrating another example of structure of the terahertz wave generation device of the third exemplary embodiment.

In the third exemplary embodiment, a structure in which the excitation light is generated by the KTP-OPO is described. However, as illustrated in FIG. 12, excitation waves may be generated using a two-wavelength light generation laser unit 220 equipped with mirrors 220a and 220b.

In this structure, a resonator is constituted by the mirror 26c and the mirror 220b in the two-wavelength light generation laser unit.

Further yet, a structure in which the optical crystal is disposed in a resonator is described in the third exemplary embodiment. However, terahertz waves may be generated without the excitation light being resonated. For example, a terahertz wave generation device may be constituted by a light source such as the KTP-OPO 20, the two-wavelength light generation laser unit 220 or the like, the mirror 26c, and the pair of holed off-axis parabolic surface mirrors 32a and 32b that are disposed between the light source and the mirror 26c so as to sandwich the optical crystal 10. In this structure, the mirror 26c and the holed off-axis parabolic surface mirrors 32a and 32b are an example of an incidence unit of the present invention.

In the third exemplary embodiment, a structure is described that uses an off-axis parabolic surface mirror as a member for mixing the two types of terahertz waves. However, a structure is possible in which the two types of terahertz waves are mixed by an optical system in which a mirror and a focusing lens are combined.

In the exemplary embodiments described above, cases in which the optical crystal is constituted by a DAST crystal and a DASC crystal are described. However, different optical crystals that exhibit non-linearity may be used. A compound that exhibits non-linearity is a compound that is formed with a structure in which an electron-accepting group and an electron-donating group are bonded to a backbone with it bonds, which is a compound represented by the following expression (1). A crystal has a crystal structure that is noncentrosymmetric. Provided the above conditions are satisfied, ionic crystals are also applicable.

$$D-X-A \qquad (1)$$

In expression (1), A represents an electron-accepting group, D represents an electron-donating group, and X represents a bivalent linking group.

Specific examples of compounds satisfying expression (1) include, besides DAST crystals and DASC crystals, BDAS-TP (bis(4-dimethylamino-N-methyl-4-stilbazolium)terephthalate), DAS-HTP (4-dimethylamino-N-methyl-4-stilbazolium hydrogen terephthalate), BNA (N-benzyl-2-methyl-4-nitroaniline), OH1(2-(3-(4-hydroxystyryl)-5,5-dimethyl cyclohex-2-enylidene)malononitrile), MC-PTS (melocyanine-p-toluene sulfonate), and the like. These compounds are illustrated below.

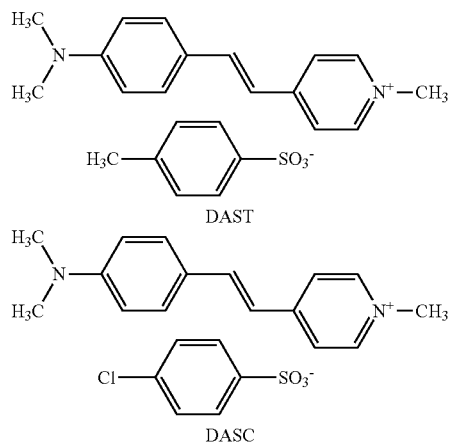

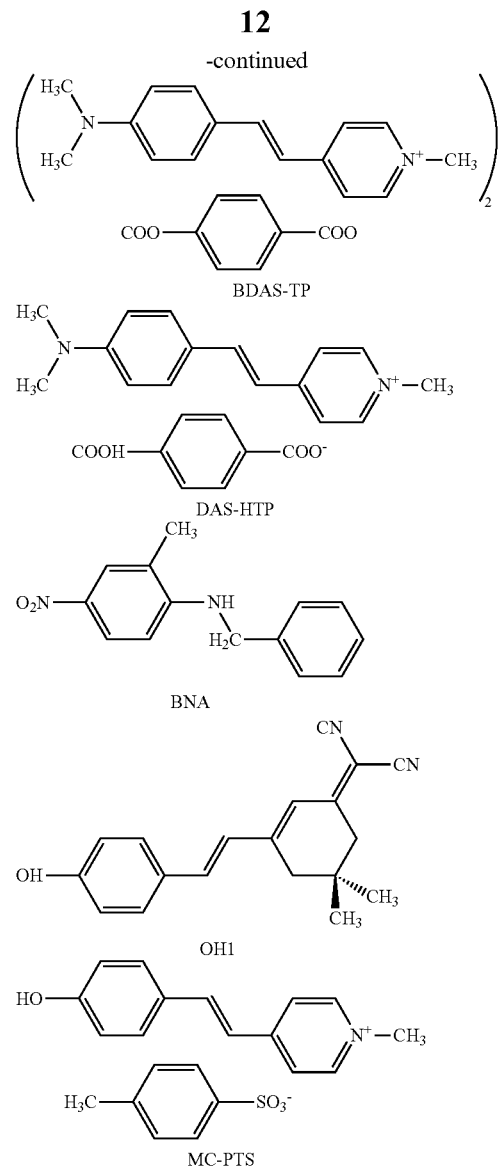

EXAMPLE

Herebelow, an example of the present invention is described in detail. The present invention is not limited in any way by this example. In the present example, testing under the following conditions was carried out using the terahertz wave generation device 212 of the third exemplary embodiment (FIG. 10).

As the pumped light source 22, a laser light source with wavelength 532 nm, pulse width 24 ns and cycling frequency 50 Hz was used. As the mirror 26a, a dichroic mirror that transmits light at the wavelength 532 nm and reflects light at the wavelength 1300 nm was used. As the SHG-cut filter 28, a cut filter that removes a wavelength component at 532 nm was used. As the detector 50, a silicon (Si) bolometer was used.

As the optical crystal 10, a crystal in which a DAST crystal and a DASC crystal were bonded together as described in the above embodiments was used. The thickness of the DAST crystal was 0.21 mm and the thickness of the DASC crystal was 0.16 mm. The transmission direction of the excitation light was the thickness direction of the crystal. In the present Example, the horizontal and vertical dimensions of the optical crystal were set to a size sufficient for all of the excitation light to be incident on the crystal. Beyond the present Example, in the present invention, dimensions of the optical crystal are not particularly limited in any direction provided the size is sufficient for all of the excitation light to be incident on a front face of the optical crystal.

The angle of the KTP crystal 24a was fixed and the angle of the KTP crystal 24b made variable. Thus, excitation light with two wavelengths—a fixed wavelength of 1350.5 mm and a variable wavelength—was generated, terahertz waves at 0.5 to 10 THz were generated as differential frequencies, and spectral characteristics thereof were measured. The spectral characteristics were measured a total of 50 times at frequency increments of 0.1 THz.

Figure 13:
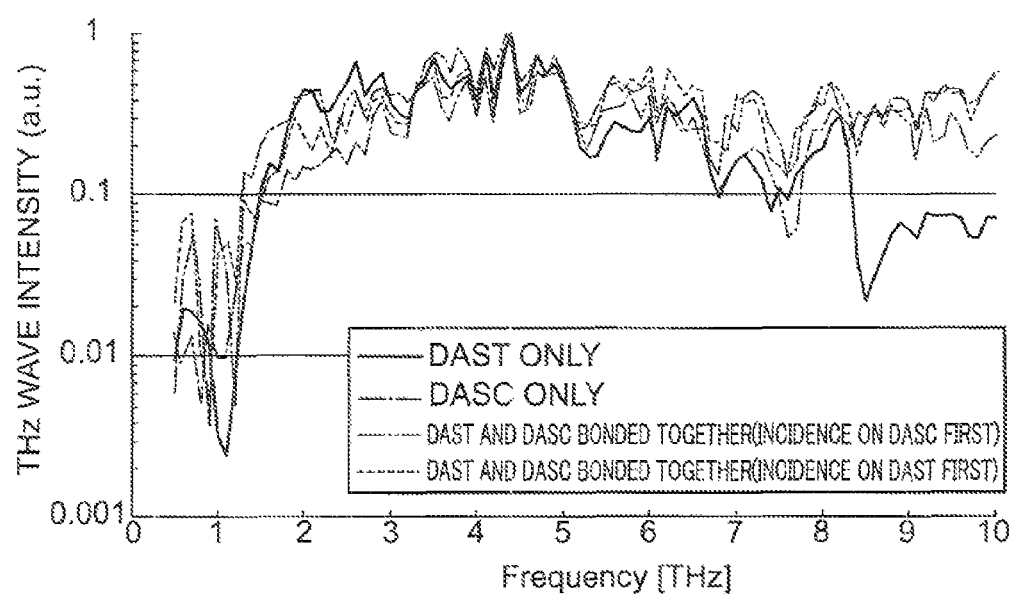
FIG. 13 is a graph illustrating a spectral characteristic of terahertz waves measured in an Example.

FIG. 13 shows the measured spectral characteristics of the terahertz waves. In FIG. 13, the vertical axis values are normalized such that the maximum value of the output is 1. For reference, in FIG. 13, the characteristics for "DAST only" and "DASC only" show spectral characteristics of terahertz waves generated when a DAST crystal alone or a DASC crystal alone is used as the optical crystal, using the terahertz wave generation device 212 of the third exemplary embodiment. The characteristics for "bonded together (incident on DAST first)" and "bonded together (incident on DASC first)" are spectral characteristics showing test results of the present Example. "Bonded together (incident on DAST first)" is the case in which the optical crystal is disposed such that the excitation light is incident first from the DAST crystal side, and "bonded together (incident on DASC first)" is the case in which the optical crystal is disposed such that the excitation light is incident first from the DASC crystal side.

As illustrated in FIG. 13, absorption of the output dependent on the characteristics of the respective crystal (the DAST crystal or the DASC crystal) was not seen in either "bonded together (incident on DAST first)" or "bonded together (incident on DASC first)". That is, by forming the optical crystal in which the DAST crystal and the DASC crystal were bonded together, terahertz waves with a characteristic in which the respective terahertz wave characteristics supplemented one another could be provided.

What is claimed is:

1. An optical crystal comprising:
a first non-linear optical crystal that generates terahertz waves corresponding to a difference frequency component in incident light with two different wavelengths by a difference frequency generation; and
a second non-linear optical crystal that generates terahertz waves corresponding to a difference frequency component in incident light with two different wavelengths by a difference frequency generation, the second non-linear optical crystal being different in material from the first non-linear optical crystal, and the first non-linear optical crystal and the second non-linear optical crystal being disposed in contact or close together.

2. The optical crystal according to claim 1, wherein the first non-linear optical crystal and the second non-linear optical crystal are disposed such that a vector direction of any optical axis of the first non-linear optical crystal and a vector direction of any optical axis of the second non-linear optical crystal are aligned in the same direction.

3. The optical crystal according to claim 2, wherein the first non-linear optical crystal and the second non-linear optical crystal are disposed such that a vector direction of an optical axis of the second non-linear optical crystal and a vector direction of a corresponding optical axis of the first non-linear optical crystal are aligned in the same direction.

4. The optical crystal according to claim 1, wherein each of the first non-linear optical crystal and the second non-linear optical crystal comprises a compound having a structure in which a backbone is a bivalent linking group, and an electron-accepting group and an electron-donating group are bonded to the backbone.

5. The optical crystal according to claim 4, wherein the compound is a compound selected from the group consisting of DAST crystal, DASC crystal, OH1, BNA, BDAS-TP, DAS-HTP and MC-TPS.

6. The optical crystal according to claim 1, wherein the first non-linear optical crystal and the second non-linear optical crystal are contacted by any of a fusing method, a crystal growth method or an adhesion method.

7. A terahertz wave generation device comprising:
the optical crystal according to claim 1;
a light generation unit that generates the light with two different wavelengths; and
an incidence unit that causes the light with two different wavelengths generated by the light generation unit to be incident on the optical crystals such that the light with two different wavelengths is transmitted in a direction through the first non-linear optical crystal to the second non-linear optical crystal and in a direction through the second non-linear optical crystal to the first non-linear optical crystal.

8. The terahertz wave generation device according to claim 7, wherein the incidence unit comprises a turning member that turns at least one of the optical crystal or the light generation unit between:
a position at which the light with two different wavelengths generated by the light generation unit is transmitted in the direction through the first non-linear optical crystal to the second non-linear optical crystal; and
a position at which the light with two different wavelengths is transmitted in the direction through the second non-linear optical crystal to the first non-linear optical crystal.

9. The terahertz wave generation device according to claim 7, wherein the incidence unit comprises:
a mirror that reflects the light with two different wavelengths generated by the light generation unit;
a transmission portion that transmits the light with two different wavelengths and light reflected by the mirror; and
a reflection surface that reflects incident terahertz waves,
wherein a pair of off-axis parabolic surface mirrors are disposed between the light generation unit and the mirror, sandwiching the optical crystal so as to reflect the incident terahertz waves.

10. A terahertz wave generation device comprising:
a first mirror;
a light generation unit that is provided with a second mirror that configures a resonator with the first mirror, the light generation unit generating light with two different wavelengths;
a pair of off-axis parabolic surface mirrors that are each provided with:
a transmission portion that transmits the incident light with two different wavelengths; and
a reflection surface that reflects incident terahertz waves, the pair of off-axis parabolic surface mirrors being disposed in the resonator so as to reflect the incident terahertz waves; and
the optical crystal according to claim 1, which is disposed between the pair of off-axis parabolic surface mirrors.

11. The terahertz wave generation device according to claim 10, further comprising a mixer that mixes the respective terahertz waves reflected from the pair of off-axis parabolic surface mirrors.

12. A terahertz wave generation method comprising:
for generating terahertz waves with a first spectroscopic characteristic, causing light with two different wavelengths to be incident on the optical crystal according to claim 1 such that the light with two different wavelengths is transmitted in a direction through the first non-linear optical crystal to the second non-linear optical crystal; and,
for generating terahertz waves with a second spectroscopic characteristic that is different from the first spectroscopic characteristic, causing the light with two different wavelengths to be incident on the optical crystal such that the light with two different wavelengths is transmitted in a direction through the second non-linear optical crystal to the first non-linear optical crystal.

13. A terahertz wave generation method comprising:
resonating light with two different wavelengths, and causing the light with two different wavelengths to be incident on the optical crystal according to claim 1 such that the light with two different wavelengths is transmitted in a direction through the first non-linear optical crystal of the optical crystal to the second non-linear optical crystal and in a direction through the second non-linear optical crystal to the first non-linear optical crystal;
generating first terahertz waves from the first non-linear optical crystal side of the optical crystal; and
generating second terahertz waves from the second non-linear optical crystal side of the optical crystal.

\* \* \* \* \*